United States Patent
Lindvall et al.

(10) Patent No.: US 6,418,314 B2
(45) Date of Patent: *Jul. 9, 2002

(54) METHODS FOR DETERMINING REGISTRATION AT A SATELLITE COMMUNICATIONS SYSTEM AND RELATED USER TERMINALS AND SYSTEMS

(75) Inventors: Hakan Lindvall; Javor Kolev, both of Cary, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,319

(22) Filed: May 1, 1998

(51) Int. Cl.[7] .......................... H04Q 7/20; H04B 7/185; G01S 7/185
(52) U.S. Cl. ...................... 455/435; 455/427; 455/12.1; 342/357.01
(58) Field of Search ................................ 455/436, 456, 455/13.1, 13.2, 435, 427, 12.1, 405, 430; 342/357

(56) References Cited

U.S. PATENT DOCUMENTS

| | | | | |
|---|---|---|---|---|
| 4,833,702 A | * | 5/1989 | Shitara et al. ................ 379/60 |
| 5,161,248 A | * | 11/1992 | Bertiger et al. ............... 455/17 |
| 5,543,813 A | * | 8/1996 | Araki et al. ............ 342/357.16 |
| 5,548,801 A | * | 8/1996 | Araki et al. ................ 455/13.1 |
| 5,552,795 A | * | 9/1996 | Tayloe et al. ................ 342/357 |
| 5,710,982 A | * | 1/1998 | Laborde et al. ................ 455/69 |
| 5,781,540 A | * | 7/1998 | Malcolm et al. ............ 370/321 |
| 5,907,541 A | * | 5/1999 | Fairholm et al. ............ 370/316 |
| 5,974,315 A | * | 10/1999 | Hudson ...................... 455/427 |

FOREIGN PATENT DOCUMENTS

| | | |
|---|---|---|
| EP | 0 663 736 A1 | 10/1994 |
| EP | 0 828 353 A2 | 3/1998 |
| GB | 2 317 536 A | 3/1998 |

* cited by examiner

*Primary Examiner*—Edward F. Urban
*Assistant Examiner*—Sheila Smith
(74) *Attorney, Agent, or Firm*—Myers Bigel Sibley & Sajovec

(57) ABSTRACT

Methods of registering a user terminal at a satellite communications system including a plurality of satellite spot beam transceivers, wherein each of the satellite spot beam transceivers defines a respective spot beam. The current spot beam registration information is transmitted from the user terminal to the satellite communications system. Updated spot beam registration information is determined for the user terminal at the satellite communications system based on the current spot beam registration information received from the user terminal. Updated spot beam registration information is transmitted from the satellite communications system to the user terminal. The user terminal updates the current spot beam registration information for the user terminal using the updated spot beam registration information received from the satellite communications system. Related systems and user terminals are also discussed.

46 Claims, 5 Drawing Sheets

Oscillation in Spot Beam Coverage

METHODS FOR DETERMINING REGISTRATION AT A SATELLITE COMMUNICATIONS SYSTEM AND RELATED USER TERMINALS AND SYSTEMS

FIELD OF THE INVENTION

The present invention relates to the field of communications and more particularly to systems and methods for satellite communications.

BACKGROUND OF THE INVENTION

Mobile communications systems allow users access to a communications network through respective user terminals as the user moves within a geographic region. Some mobile communications systems partition the geographic region into areas wherein each area may be covered by a portion of the mobile communications system. Consequently, if a user moves from a first area to a second area within the serviced geographic region, the mobile communications system may stop providing service in the first area and start providing the service in the second area to maintain the user's access. The users may access the mobile communications system using a user terminal.

Figure 1A:
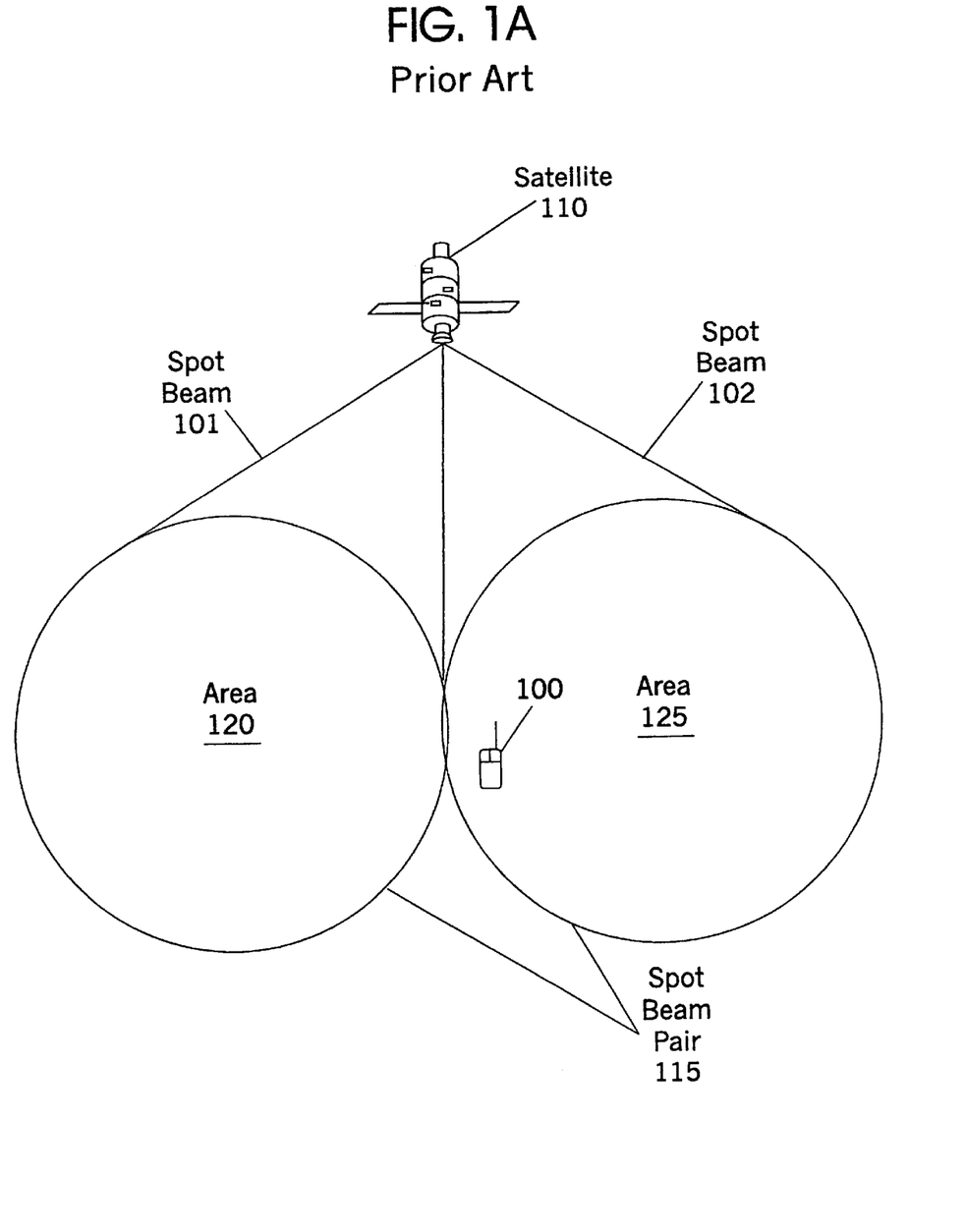
FIG. 1A is a diagram of a satellite communications system according to the prior art.

FIG. 1A illustrates a satellite communications system which provides communication service to user terminals located within areas 120 and 125 via respective spot beams 101 and 102. The satellite system provides communication service to user terminal 100 by registering the user terminal 100 within the spot beam corresponding to the area within which the user terminal is located. For example, if the user terminal 100 were located in area 125, the satellite system would register the user terminal 100 as located in area 125 and communicate with the user terminal 100 via spot beam 102. If, however, the user terminal 100 were to relocate to area 120, the satellite system may re-register the user terminal 100 as located in area 120 and subsequently communicate with the user terminal 100 via spot beam 101.

Spot beams 101 and 102 may provide respective communications channels for communications between the satellite 110 and the user terminal 100. In particular, a spot beam may provide respective control channels to user terminals within the area covered by the spot beam. A control channel may carry information concerning the service provided to the area covered by the respective spot beam. For example, spot beam 102 may broadcast information over a control channel which identifies spot beam 102 to user terminals located within area 125, and may also identify traffic channels assigned to the spot beam. Spot beams may also be grouped in beam pairs so as to identify spot beams which are adjacent. For example, spot beam 102 and spot beam 101 form a beam pair 115. Moreover, a user terminal 100 may be registered with spot beam 101, spot beam 102, or the beam pair 115.

The user terminal 100 may be a communications device, such as a radio telephone, which is capable of communicating with the satellite communications system.

The location of the user terminal 100 may be registered via a location update procedure. The location update procedure is a communications protocol whereby the user terminal 100 may notify the satellite system of the user terminal's location within the geographic region. A location update procedure may be performed when the user terminal 100 moves to a new area and requires re-registration in the new area. The user terminal 100 may initiate the location update procedure when the user terminal 100 detects that the signal strength of its present spot beam is less powerful than that of another spot beam. For example, if the user terminal 100 were located within area 125 serviced by spot beam 102 and subsequently moved to area 120, the user terminal 100 may detect the greater signal strength of spot beam 101. Upon detecting the greater signal strength of the spot beam 101, the user terminal 100 switches from the control channel associated with spot beam 102 to the control channel associated with spot beam 101 and notifies the satellite communications system of its new location corresponding to area 120 using the information broadcast on the control channel associated with spot beam 101. Thus the user terminal 100 re-registers with the satellite system in area 120. Subsequently, the satellite communications system communicates with the user terminal 100 using spot beam 101. The user terminal 100 may also perform periodic location update procedures if the user terminal 100 operates in a particular location for some period of time.

Figure 1B:
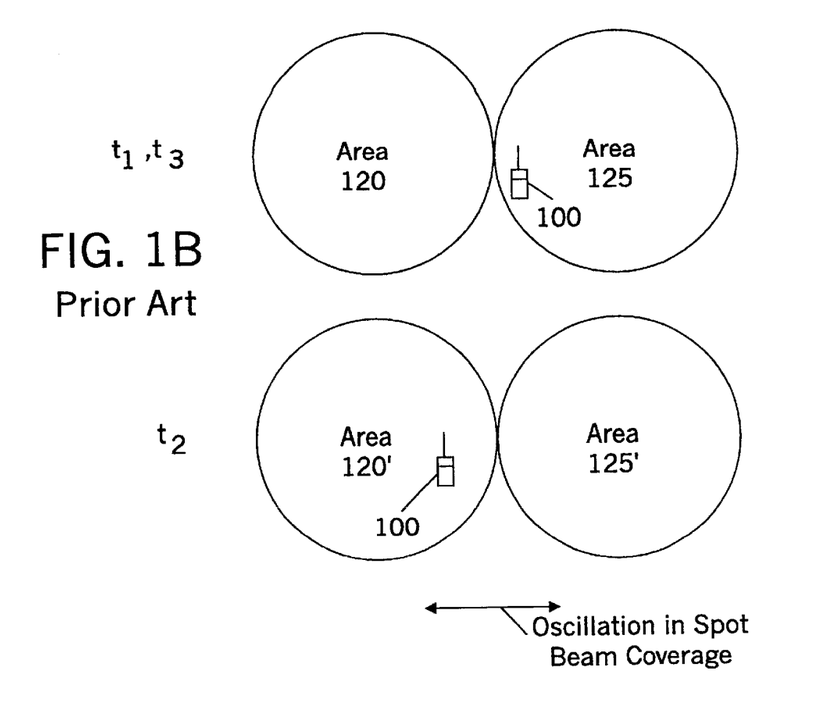
FIG. 1B is an illustration of alternating spot beam coverage associated with a satellite having an inclined orbit according to the prior art.

Some satellites may exhibit a behavior known as an inclined orbit wherein the spot beams projected onto the geographic region periodically shift or oscillate. Such an oscillation is illustrated in FIG. 1B. At a time $t_1$, the satellite 110 services the area 120 via spot beam 101 and the area 125 via spot beam 102. The user terminal 100 is located within the area 125 serviced by spot beam 102. At a time $t_2$, the inclined orbit may cause an oscillation in the spot beams covering areas 120 and 125. Specifically, spot beam 101, formerly covering area 120, now covers area 120'. Similarly, the spot beam 102, formerly covering area 125, now covers area 125'. Moreover, user terminal 100, formerly located in area 125, is now located within the area 120' serviced by spot beam 101. Thus, the user terminal 100 has experienced a shift in spot beam service without moving. At a time $t_3$, the coverage shown at time $t_1$ may be restored, causing yet another shift in the coverage of the spot beams and the service to the user terminal 100. The oscillation associated with an inclined orbit may be such that the shift in spot beam coverage described in FIG. 1B happens periodically.

As described above, the user terminal 100 may initiate location update procedures upon detecting a change in the spot beam service. At time $t_1$, for example, the user terminal 100 detects service via spot beam 102. At time $t_2$, however, user terminal 100 detects a change such that its service is provided by spot beam 101. Consequently, the user terminal 100 may initiate a location update procedure. Subsequently, the user terminal 100 may detect another shift in spot beam service when the inclined orbit causes an oscillation in the reverse direction. Consequently, the user terminal may perform yet another location update. Moreover, a location update procedure may be requested for each periodic shift in the spot beam coverage.

The user terminal 100 may also detect a change in spot beam service when the user terminal moves from one area to another. For example, if user terminal 100 were moved from area 125 to area 120, the user terminal may detect the change in spot beam service from spot beam 102 to spot beam 101. The user terminal 100 may then perform a location update procedure to register with spot beam 101.

Existing systems may use a registration process to reduce the number of location updates produced by oscillations in spotbeam coverage by presuming that the original spot beam coverage will resume within a predetermined time. The registration process may require each spot beam to broadcast a single location area code (LAC) which uniquely identifies the spot beam within the satellite system and a list of neighboring spot beams called beam pairs on a corresponding control channel. When the user terminal 100 detects a shift in its spot beam service, the user terminal 100 may determine whether a location update procedure is required or if a location update may possibly be unnecessary due to the oscillation behavior described above. The information broadcast on the control channel may require considerable system bandwidth for each spot beam.

If the user terminal 100 determines that the new servicing spot beam forms a beam pair with the registered spot beam, the user terminal 100 may register with the spot beam pair by performing a location update procedure so as to avoid repeatedly re-registering with a new spot beam every time the oscillation occurs. When the user terminal 100 registers with the servicing beam pair, the user terminal 100 starts a beam pair location update timer, wherein the duration of the beam pair location update timer exceeds the period of oscillation associated with the inclined orbit. For example, if the inclined orbit were such that the period of oscillation were six hours, the duration of the beam pair location update timer 220 would be greater than six hours. If the user terminal 100 detects the restoration of the original spot beam coverage before the expiration of the beam pair location update timer, the user terminal 100 stays registered with the spot beam pair currently providing service.

If, however, the user terminal 100 does not detect the restoration of the original spot beam coverage before the expiration of the beam pair location update timer, the user terminal 100 will re-register with the single servicing spot beam by performing another location update procedure. Consequently, if a shift in spot beam coverage is due to the movement of the user terminal 100 and not due to the inclined orbit behavior described above, the user terminal 100 will perform two location updates to complete the registration with a single spot beam: first when presuming oscillating coverage and second when the beam pair location update timer expires. Consequently, systems according to the prior art may perform redundant location updates when the user terminal is moved from a first spot beam to an adjacent spot beam that defines a spot beam pair with the first spot beam.

Errors which go undetected during the implementation of a satellite communications system such as those described herein, may be costly to repair. For example, a design error may be expensive or complex to fix if each user terminal 100 needs to be serviced. Furthermore, operational adjustments of the satellite communications system may be difficult for similar reasons. For example, changes in the inclined orbit behavior may be difficult to accommodate without altering the individual user terminals.

Notwithstanding the communications systems and methods discussed above, there continues to be a need to further reduce the number of location update procedures which occur within satellite communications systems and allow a reduction in the cost and complexity of addressing system errors and implementing system adjustments.

SUMMARY OF THE INVENTION

It is therefore an object of the present invention to provide improved satellite communications systems and related methods and terminals.

It is another object of the present invention to reduce the number of location update procedures within a satellite communications system.

It is still another object of the present invention to reduce the complexity of user terminals used within a satellite communications system.

These and other objects are provided by methods of registering a user terminal at a satellite communications system including a plurality of satellite spot beam transceivers, wherein each of the satellite spot beam transceivers defines a respective spot beam. The current spot beam registration information is transmitted from the user terminal to the satellite communications system. Updated spot beam registration information is determined for the user terminal at the satellite communications system based on the current spot beam registration information received from the user terminal. Updated spot beam registration information is transmitted from the satellite communications system to the user terminal. The user terminal updates the current spot beam registration information for the user terminal using the updated spot beam registration information received from the satellite communications system.

In particular, the current spot beam registration information may include a user terminal timer value which provides a duration of service provided by the current servicing spot beam within a spot beam pair. The current spot beam registration information may also include a current servicing spot beam and a previous servicing spot beam wherein the current servicing spot beam currently provides service to the user terminal and wherein the previous spot beam provided service to the user terminal immediately prior to the current servicing spot beam.

The present invention offers several advantages over the prior art. In particular, determining updated spot beam registration at the satellite communications system may help reduce the cost and complexity of correcting design errors and implementing operational adjustments. Instead, operational adjustments and corrections may be implemented at the satellite communications system rather than at each user terminal. In addition, the present invention may allow a reduction in the number of location update procedures associated with user terminal mobility.

In particular, the user terminal can use one location update procedure to register with a single spot beam after having been registered with a spot beam pair. This situation may be common when a user terminal is moved from a single spot beam to an adjacent spot beam which defines a spot beam pair with the previous servicing spot beam. In contrast, according to the prior art, the user terminal may initiate an additional location update procedure to register with a single spot beam after having been registered with a spot beam pair. Consequently, moving the user terminal to an adjacent spot beam may cause an additional location update procedure to be used according to the prior art.

The transmission of the current spot beam registration information to the satellite communications system is triggered by communication between the user terminal and the satellite communications system. In particular, the user terminal timer value is transmitted to the satellite communications system in conjunction with communications, such as a telephone call. The satellite communications system can thereby monitor the duration of the current servicing spot beam within a spot beam pair. Upon detecting that the timer value exceeds the oscillation period associated with the inclined satellite orbit, the satellite communications system updates the registration of the user terminal to the single current servicing spot beam. Thus, the present invention can reduce the number of location update procedures used to register the user terminal with a single spot beam when the user terminal is moved to an adjacent spot beam which defines a spot beam pair with the previous servicing spot beam. In addition, the present invention allows the registration process described herein to be modified at the satellite communications system after implementation of the system. Alternately, the registration process may be disabled when the oscillating behavior associated with the inclined orbit ceases or is diminished.

The transmission of the current spot beam registration information to the satellite communications system is also triggered by detection of new servicing spot beam other than the current servicing spot beam and the previous servicing spot beam and the expiration of a periodic location update timer wherein the periodic location update timer measures a duration of service provided to the user terminal since a previous expiration of the periodic location update timer. The present invention uses the triggered location update procedures to transmit the current spot beam registration information to reduce the number of location updates used by the satellite communications system. The present invention therefore may allow a reduction in the satellite communications bandwidth by using fewer location update procedures to transmit information to the satellite communication system.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is described herein using flowcharts illustrating operations of the present invention. It will be understood that each block of the flowchart illustrations, and combinations of blocks in the flowchart illustrations, can be implemented by computer program instructions. These program instructions may be provided to a processor(s) within the satellite communications system and/or user terminal, such that the instructions which execute on the processor(s) create means for implementing the functions specified in the flowchart block or blocks. The computer program instructions may be executed by the processor(s) to cause a series of operational steps to be performed by the processor(s) to produce a computer implemented process such that the instructions which execute on the processor(s) provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 2A:
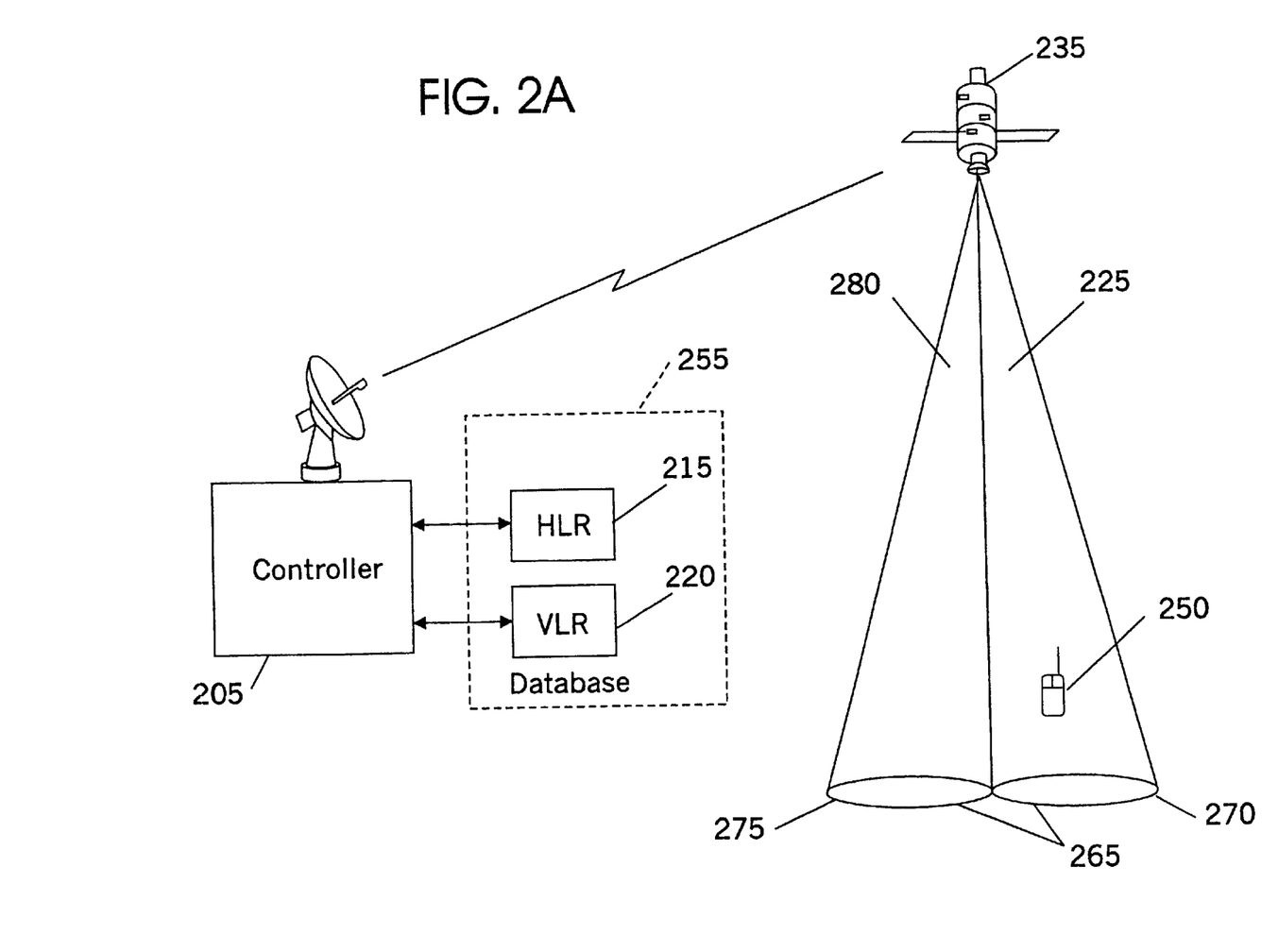
FIG. 2A is a diagram of a satellite communications system according to the present invention.

FIG. 2A is a block diagram of a satellite communications system according to the present invention. The satellite communications system includes a satellite 235 with a plurality of satellite spot beam transceivers 235 that define respective spot beams providing service to user terminals within corresponding areas. For example, spot beam 225 provides service to the user terminal 250 when the user terminal 250 is used in area 270. Similarly, if the user terminal 250 is used in area 275, the satellite communications system provides service to user terminal 250 via spot beam 280.

Each spot beam may be identified by a corresponding location area identifier (LAI) which the satellite communications system broadcasts on a control channel associated with the corresponding spot beam. The satellite communications system designates particular adjacent spot beams as spot beam pairs. For example, spot beam 225 and spot beam 280 define spot beam pair 265. The spot beam which currently provides the user terminal 250 with coverage is referred to as the current servicing spot beam. The spot beam which provided coverage to the user terminal 250 immediately prior to the current servicing spot beam is referred to as the previous servicing spot beam. The user terminal 250 stores the LAI of the current and previous servicing spot beams as the spot beam coverage to the user terminal 250 changes.

The satellite communications system provides service to user terminals using current spot beam registration information for each user terminal within the satellite communications system, thereby enabling communication with a particular user terminal. For example, when the user terminal 250 is registered with the spot beam 225, the satellite communications system provides service to the user terminal 250 via spot beam 225. Furthermore, a user terminal may be registered with a single spot beam or a spot beam pair. The satellite communications system may update the registration of the user terminal 250 as the user terminal moves from one area to another. For example, the user terminal 250 may be registered with the spot beam 225 when the user terminal 250 is located in area 270. When the user terminal 250 moves to area 275, the satellite communications system may update the registration of the user terminal 250 to spot beam 280. Subsequently, the satellite communications system communicates with the user terminal 250 via spot beam 280.

The satellite communications system also provides for periodic communication from the user terminal 250. The periodic communication, referred to as a periodic location update procedure, enables the satellite communications system to establish the status of the user terminal 250 over time. The periodic location update procedure is initiated by the user terminal 250 at the expiration of a periodic location update timer which measures a duration of service provided to the user terminal 250 since previous communications from the user terminal 250 to the satellite communications system caused the periodic location update timer to be re-started. For example, if the user terminal 250 is stationary within area 270, the user terminal 250 will initiate a periodic location update procedure when the periodic location update timer expires. The periodic location update timer is then re-initiated. Alternatively, if the user terminal moves to area 275 before the periodic location update timer expires, the periodic location update timer may be re-initiated without having performed a periodic location update procedure because an update was initiated responsive to the change of service. In addition, the user terminal 250 communicates with the satellite communications system to provide telephone service to the user.

As described above, an inclined satellite orbit can cause a period of oscillation associated with adjacent spot beams causing alternating spot beam coverage of the user terminal. For example, when the user terminal 250 is used in an area of alternating coverage within area 270, the user terminal 250 will be alternatingly serviced by spot beam 225 and spot beam 280. In particular, the spot beam 225 and the spot beam 280 will each provide service to the user terminal 250 for an oscillation period. Furthermore, during one period of oscillation, spot beam 280 is designated as the current servicing spot beam and the spot beam 225 is designated as the previous servicing spot beam for user terminal 250. During the next period of oscillation, the spot beam 225 is designated as the current servicing spot beam and the spot beam 280 is designated as the previous servicing spot beam for user terminal 250.

In addition, a user terminal timer value indicates the duration of the service provided by the current servicing spot beam to the user terminal 250. For example, if the spot beam 225 is the current servicing spot beam for the user terminal 250, the user terminal timer value indicates how long the spot beam 225 has been the current servicing spot beam. The user terminal timer value is re-initiated each time the user terminal 250 enters a spot beam that defines a spot beam pair within which the user terminal 250 is registered. When the user terminal 250 is registered with a spot beam pair, the user terminal 250 maintains the spot beam pair registration until the satellite communications system updates the user terminal 250 registration. Thus, the present invention may reduce the number of location update procedures performed during periods of alternating coverage. The user terminal timer value is generated so as to avoid premature wrap-around or overflow of the value. For example, when the user terminal timer value reaches the maximum value that may be stored, the maximum value is stored in the user terminal 250. In other words, the user terminal timer value does not wrap-around to zero after reaching the maximum count that can be stored in the user terminal 250. Moreover, the user terminal 250 can store a user terminal timer value that is substantially greater than the oscillation period associated with the inclined satellite orbit.

Current spot beam registration information may be transmitted to the satellite communications system in conjunction with a location update procedure or in conjunction with communications between the user terminal 250 and the satellite communications system. The location update procedure is a communications protocol whereby the user terminal 250 may notify the satellite communications system of the user terminal's location within the satellite communications system. A location update procedure is triggered upon detecting a need to register the user terminal 250 with the satellite communications system, such as the expiration of the periodic location update timer or when the user terminal 250 detects a new serving spot beam having an LAI other than the LAIs corresponding to the current and previous servicing spot beams. The communications between the user terminal 250 and the satellite communications system includes a telephone call.

When triggered by a location update procedure, the current spot beam registration information includes the LAI of the current servicing spot beam and the LAI of the previous servicing spot beam. For example, when the user terminal 250 relocates from area 270 to area 275, the current servicing spot beam is spot beam 280 and the previous servicing spot beam is spot beam 225. Accordingly, the user terminal transmits the LAI of spot beam 225 and the LAI of spot beam 280 to the satellite communications system. The current spot beam registration information also includes the user terminal timer value if the user terminal timer value is running (such as when the user terminal 250 is registered within a spot beam pair. If no previous servicing spot beam LAI exists or if the previous servicing spot beam entry within the user terminal 250 is invalid, the user terminal 250 may send the current servicing spot beam as the current spot beam information.

Figure 2B:
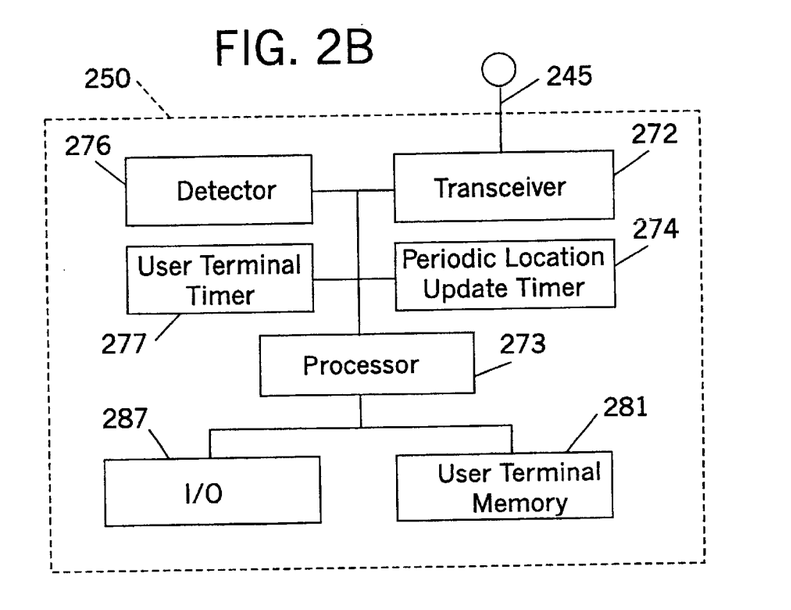
FIG. 2B is a block diagram of a user terminal according to the present invention used within the satellite communications system of FIG. 2A.

When triggered by communications from the user terminal 250 to the satellite communications system, the current spot beam registration information is a user terminal timer value which provides a duration of service provided by the current servicing spot beam within a spot beam pair. The user terminal timer value is included in the current spot beam registration information when the user terminal timer value is running when the user terminal 250 is registered with a spot beam pair. For example, when the user terminal 250 is registered with the spot beam pair 265 and is currently covered by spot beam 225 as part of spot beam pair 265, the user terminal timer value indicates the time for which spot beam 225 has provided service since the previous oscillation in spot beam coverage. The user terminal timer value may be generated by the user terminal timer 277.

The satellite communications system may thereby use the user terminal timer value to monitor the duration of the current servicing spot beam while the user terminal 250 is registered with the spot beam pair. If the satellite communications system determines that the duration of the current servicing spot beam exceeds the oscillation period, the spot beam registration of the user terminal can be updated to reflect registration with the single servicing spot beam. Subsequently, the satellite communications system may page the user terminal 250 in both spot beams defining the beam pair in which the user terminal 250 was previously registered. When the user terminal 250 responds to the page, the communications system can determine which spot beam is currently servicing the user terminal 250 and communicate with the user terminal 250 using the appropriate spot beam. Consequently, the present invention may allow a reduction in system communications bandwidth requirements because a number of location updates can be reduced.

The controller 205 receives current spot beam registration information transmitted from the user terminal 250 via the corresponding spot beam control channel. For example, the controller 205 may receive current spot beam registration information from the user terminal 250 indicating that the user terminal 250 is currently serviced by the spot beam 225 and that the user terminal 250 was previously serviced by the spot beam 280. In addition, the current spot beam registration information may include the user terminal timer value indicating the duration of the current servicing spot beam coverage.

The controller 205 uses the current spot beam registration information to update the registration of the user terminal. In particular, the controller uses the database 255 to determine if the user terminal 250 is being serviced by a single spot beam or a spot beam pair. For example, if the current registration information indicates that the user terminal 250 is currently serviced by the spot beam 225 and was previously serviced by a spot beam which does not define a spot beam pair with the spot beam 225, the controller 205 updates the spot beam registration information for the user terminal 250 by indicating that the user terminal 250 is currently serviced by the single spot beam 225.

Alternatively, if the current registration information indicates that the current and previous servicing spot beams define a spot beam pair, the controller 205 determines if the current servicing spot beam has provided service for a duration which exceeds the period of oscillation associated with the inclined orbit using the user terminal timer value. If the user terminal timer value does not exceed the period of oscillation associated with the current and previous servicing spot beams, the controller 205 indicates that the user terminal 250 is registered with the spot beam pair defined by the current and previously servicing spot beam. If the user terminal timer value exceeds the period of oscillation associated with the current and previous servicing spot beams, the controller 205 indicates that the user terminal 205 is registered with the single current servicing spot beam.

For example, if user terminal 250 is currently serviced by the spot beam 225 and was previously serviced by the spot beam 280 and the user terminal timer value exceeds the period of oscillation associated with the spot beam pair 265, the controller 205 determines that the shift in spot coverage for the user terminal 250 is due to movement of the user terminal 250 rather than the oscillation associated with the beam pair 265. Consequently, the controller 205 indicates that the user terminal 250 is registered with the single current servicing spot beam 225. The controller 205 transmits the updated spot beam registration information to the user terminal 250 via the satellite 235 so that the user terminal may update the current spot beam registration information stored in the user terminal 250. In one embodiment, the controller 205 is a mobile switching center.

A satellite communications system according to the present invention, therefore, determines updated registration information based on the current and previous servicing spot beams received from the user terminal 250 in conjunction with a location update procedure or communications between the user terminal 250 and the satellite communications system. If the current and previous servicing spot beams define a spot beam pair and the current servicing spot beam has provided spot beam coverage for a duration which exceeds the period of oscillation, the satellite communications system updates the user terminal 250 registration to indicate that the user terminal 250 is registered with a single servicing spot beam.

Thus, the present invention allows a reduction in the number of location update procedures when the user terminal is moved from one area to another by transmitting registration information in conjunction with a location update procedure. The location update procedure may be triggered by the expiration of the periodic location update timer or the detection of a new servicing spot beam, by the user terminal 250, which is not stored in the user terminal memory. In contrast, in systems according to the prior art, if a user terminal is initially registered with a single spot beam is moved to a new spot beam which defines a spot beam pair with the initial spot beam, the user terminal will re-register with the spot beam pair. After the period of oscillation expires, the spot beam coverage to the user terminal is still provided by the new spot beam, therefore the user terminal registers a second time. Consequently, the prior art may use an additional location update procedures to register a user terminal with a single spot beam when the user terminal is moved to a different area within the system. In other words, spot beam registrations of the prior art are determined at the user terminal.

The database 255 of the present invention stores spot beam pair records that identify the spot beams which define spot beam pairs within the satellite communications system. For example, database 255 contains a record indicating that the spot beam 225 and the spot beam 280 define the spot beam pair 265. The controller 205 uses the database 255 to determine whether the user terminal 250 is subject to oscillating spot beam coverage. In particular, the controller 205 uses the database 255 to determine if the current servicing spot beam and the previous servicing spot beam define a spot beam pair.

For example, when user terminal 250 is initially located in area 270 and subject to oscillating coverage, service is alternatingly provided to the user terminal 250 by the spot beam 225 and the spot beam 280. Consequently, the current registration information received from the user terminal 250 will include the spot beam 225 and the spot beam 280. The controller 205 uses the database 255 to determine that the spot beam 225 and the spot beam 280 define the spot beam pair 265 within the satellite communications system. In one embodiment, the database 255 includes a home location register 215 that stores records of subscribers to the satellite communications system. The database 255 may also include a visitor location register 220 that stores records of subscribers of other satellite communications systems who have an agreement with the satellite communications system of the present invention.

As discussed above, the controller 205 and the database 255 are discussed as a portion of a ground station coupled with the satellite 235 via radio links. It will be understood, however, that the functionality of the controller 205 and the database 255 discussed above can be partitioned between the ground station and the satellite. Alternately, this functionality can be provided at the satellite. Furthermore, the satellite communications system can include one ground station and satellite as shown, or multiple ground stations and/or satellites can be included.

Referring now to FIG. 2B, the user terminal 250 may be a communications device, such as a radio telephone, which is capable of communicating with the satellite communications system. The user terminal 250 can alternately be a personal computer, a personal digital assistant, or other electronic device adapted to provide communications with the satellite communications system. The user terminal 250 can include an antenna 271 for broadcasting and receiving communications between the satellite transceiver 235 and the user terminal 250. The transceiver 271 accepts communications from the processor 273 for transmission to the satellite transceiver 235 and accepts received communications from the satellite transceiver. The detector 276 detects the signal strength of spot beams accepted by the transceiver 277. The periodic location update timer 274 measures the time elapsed since the last location update procedure was performed. The processor 273 manages the user terminal operations and coordinates the operation of the components described herein. The user terminal memory 281 stores the current and previous servicing spot beam LAIs and information for the operation and management of the user terminal 250. The user terminal memory 281 may be a non-volatile memory. The I/O interface 287 provides general purpose input and output functions for the user terminal 250. For example, the I/O interface 287 may include a keypad, a display, a microphone, and speaker for the user terminal 250.

The user terminal 250 stores the current and previous servicing spot beam LAIs in the user terminal memory 281. When the user terminal 250 is moved from one area to another within the satellite communications system, the current and previous servicing spot beam LAIs stored in the user terminal 250 may change. For example, if the user terminal 250 is initially located in area 270 without previously having service in an adjacent area, the LAI for the spot beam 225 is stored in the user terminal memory 281 as the current servicing spot beam, and initially there is no previous servicing spot beam stored. In other words, the previous servicing spot beam entry in the user terminal memory 281 is invalidated. When the user terminal 250 is moved to area 275, the user terminal 250 detects the spot beam 280 as the new servicing spot beam. The current servicing spot beam (spot beam 225) is stored in the user terminal memory as the previous servicing spot beam and the new servicing spot beam (spot beam 280) is stored in the user terminal memory 281 as the current servicing spot beam.

The user terminal 250 may initiate a location update procedure when the user terminal 250 detects that the signal strength of its current servicing spot beam is less powerful than that of a new serving spot beam, and the new servicing spot beam is not the previous servicing spot beam stored in the user terminal memory 281. For example, if the user terminal 250 were located within area 270 serviced by spot beam 225 and subsequently moved to area 275, the user terminal 250 detects the greater signal strength of the spot beam 280. Upon detecting the greater signal strength of the spot beam 280, the user terminal 250 determines if the LAI of the new servicing spot beam 280 is stored in the user terminal memory 281 as the current or previous servicing spot beam. If the new servicing spot beam is not contained in the user terminal memory 281, the current servicing spot beam stored in the user terminal memory 281 becomes the previous servicing spot beam and the new servicing spot beam becomes the current servicing spot beam stored in the user terminal memory 281. Because the new servicing spot beam was not stored in the user terminal memory 281, a location update procedure is triggered.

Alternatively, the user terminal 250 may determine that the LAI of the new servicing spot beam is contained in the user terminal memory 281 so that the user terminal 250 does not initiate a location update procedure. Accordingly, a location update procedure is not triggered when service oscillated between two spot beam of a spot beam pair. For example, if in the above example the new servicing spot beam is contained in the user terminal memory 281 as the previous servicing spot beam, the current servicing spot beam becomes the previous servicing spot beam and the previous servicing spot beam becomes the current servicing spot beam, and a location update procedure is not triggered.

The user terminal 250 receives updated spot beam registration information from the satellite communications system indicating the registration of the user terminal 250 when the satellite communications system determines that the registration should be changed. The updated spot beam registration information indicates that the user terminal 250 is registered by the satellite communications system with a spot beam pair or a single spot beam. If the updated spot beam registration information indicates that the user terminal 250 is registered with a spot beam pair, the user terminal 250 stores the updated spot beam registration information in the user terminal memory 281. If the updated spot beam registration information indicates that the user terminal 250 is registered with a single spot beam, the user terminal 250 stores the updated spot beam registration information as the current servicing spot beam and invalidates the previous servicing spot beam entry in the user terminal memory 250.

Figures 3, 3A:
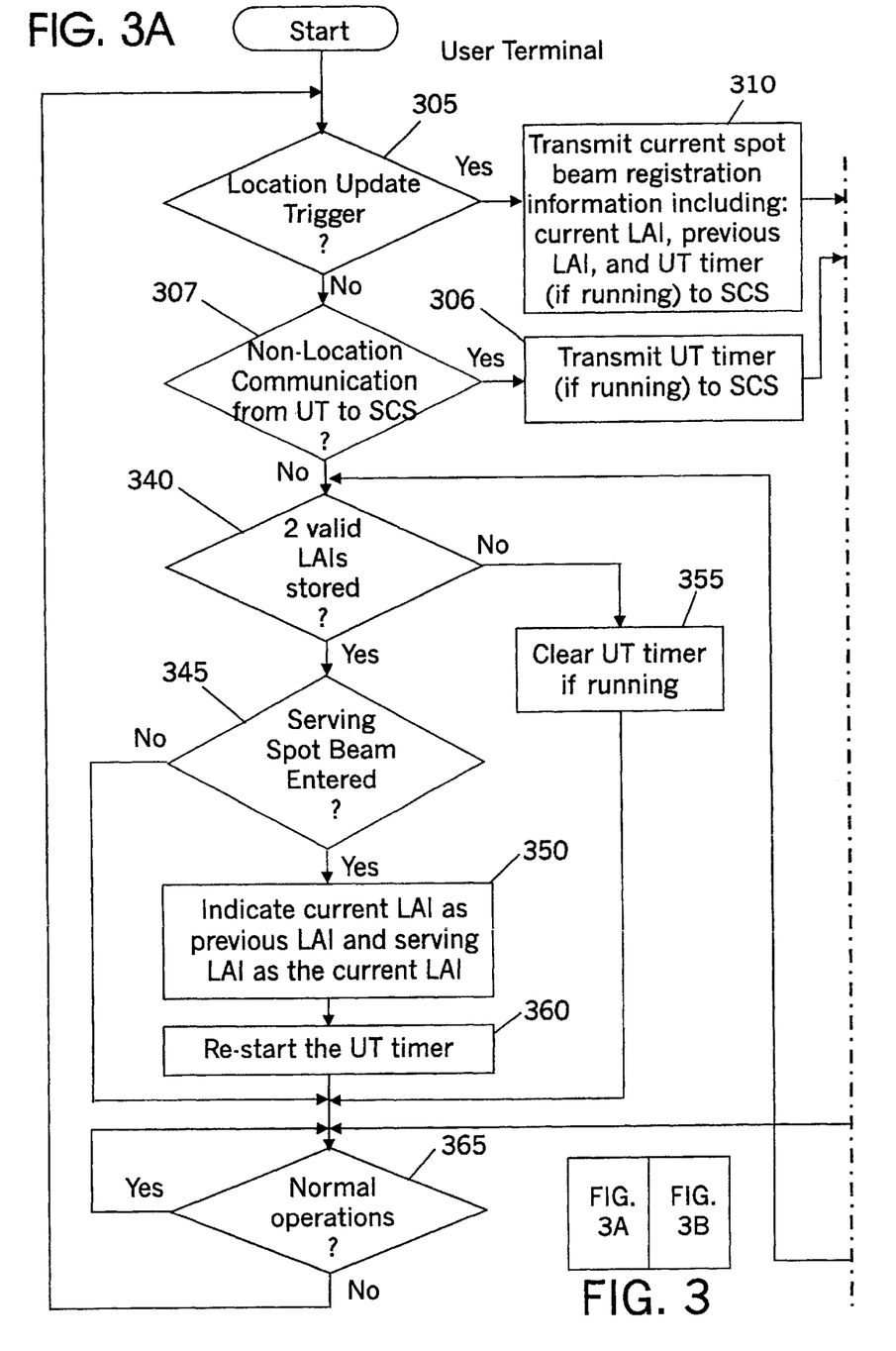
FIG. 3 is a flowchart illustrating operations of a satellite communications system according to the present invention.
Figure 3B:
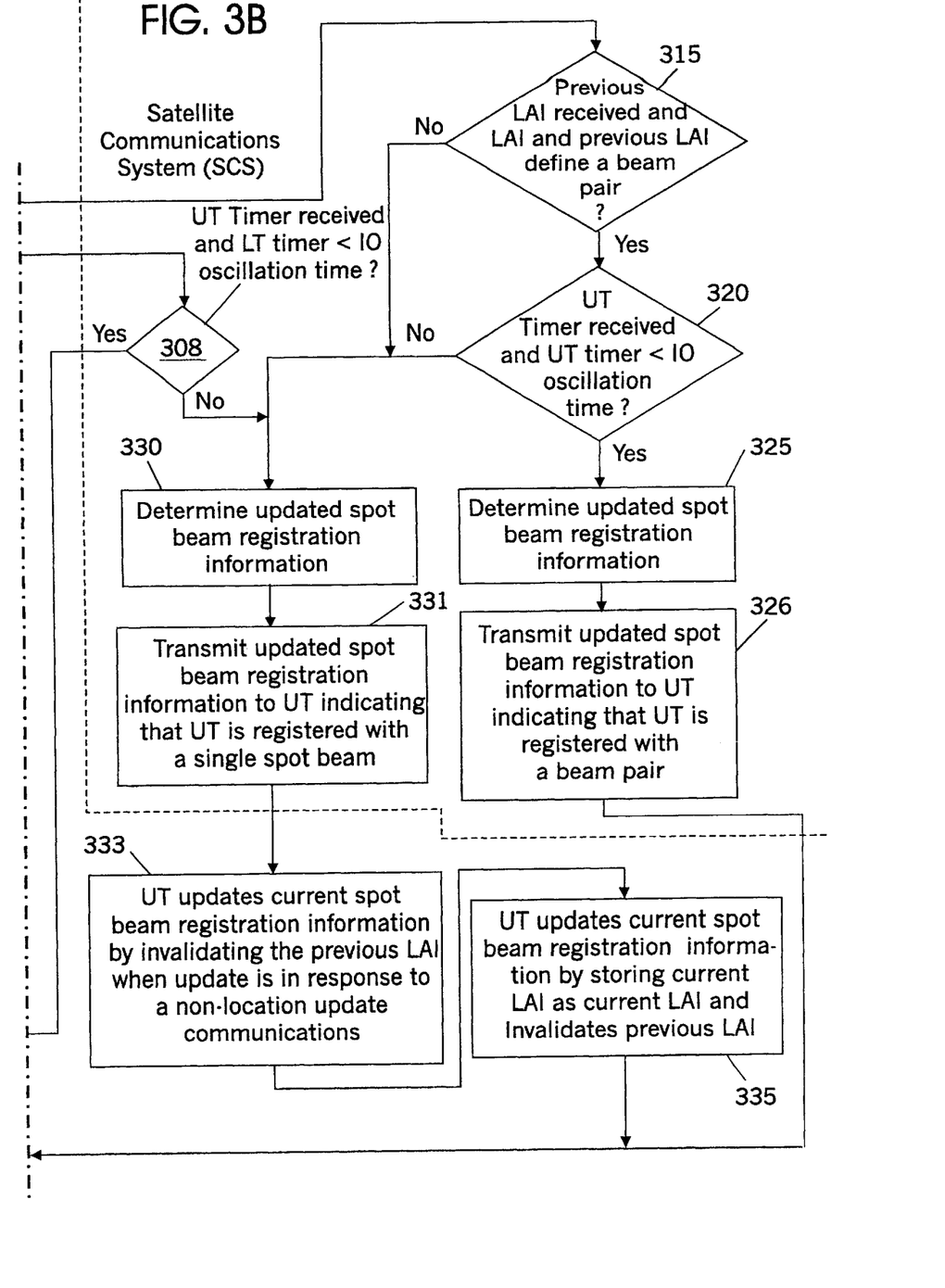

FIG. 3 is a flowchart illustrating operations of a satellite communication system according to the present invention. A location update may be triggered (Block 305) when the user terminal detects that registration with the satellite communications system may be needed (such as when the user terminal is not registered with the satellite communications system, or when the user terminal detects a new servicing spot beam having an LAI other than the LAIs corresponding to the current and previous servicing spot beams stored in the user terminal, or when the periodic location update timer expires). If an update is not needed, the user terminal operations continue at Block 307. If the user terminal does not initiate non-location update procedure communications to the satellite communications system (Block 307), such as a telephone call, processing continues at Block 340.

If either the current servicing spot beam or the previous servicing spot beam stored in the user terminal is invalid (Block 340), the user terminal timer value is cleared, if running (Block 355), and the user terminal continues normal operations (Block 365). If the current servicing spot beam and the previous servicing spot beam stored in the user terminal are valid (Block 340), such as when the user terminal is registered with a spot beam pair, the user terminal determines if a new servicing spot beam is detected, indicating that the spot beam coverage for the user terminal has shifted to the previous servicing spot beam (Block 345) of the spot beam pair. If the user terminal detects a shift in the spot beam coverage, the current servicing spot beam is designated as the previous servicing spot beam and the previous servicing spot beam is designated as the current servicing spot beam (Block 350), the user terminal timer value is re-started (Block 360), and the user terminal continues normal operations (Block 365).

During normal operations (Block 365), the user terminal carries out registrations, communications, and other required functions. The user terminal reenters Block 305 from normal operations (Block 365), upon detecting a new spot beam.

Now referring back to Block 305, if an update is triggered, the user terminal transmits current spot beam registration information to the satellite communications system (Block 310). The current spot beam registration information may include the LAI of the current servicing spot beam and the LAI of the previous servicing spot beam. Alternately, the current spot beam registration information includes the user terminal timer value when the user terminal timer value is running, such as when the user terminal is registered in a spot beam pair. A location update procedure can be triggered when the user terminal is not registered with the satellite communications system, upon the expiration of the periodic location update timer, or when the user terminal 250 detects a new serving spot beam having an LAI other than the LAIs corresponding to the current and previous servicing spot beams.

The satellite communications system determines updated spot beam registration information based the current spot beam registration information received from the user terminal. In particular, if the current servicing spot beam and the previous servicing spot beam do not define a spot beam pair (Block 315), the satellite communications system determines that the user terminal is registered with the single current servicing spot beam, determines (Block 330) that the previous servicing spot beam stored in the user terminal is invalid, and transmits the updated spot beam registration information to the user terminal (Block 331). The user terminal updates the current spot beam registration information stored in the user terminal memory using the received updated spot beam registration information (Block 335) by invalidating the previous LAI when the updated spot beam registration information is provided in response to non-location update procedure communications (Block 307). Alternately, the user terminal updates the current spot beam registration information stored in the user terminal memory using the received updated spot beam registration information (Block 335) by storing the current LAI as the current LAI and invalidating the previous LAI when the updated spot beam registration information is provided in response to a location update procedure (Block 305). The user terminal operations then resume at Block 340 with the current servicing spot beam wherein the previous servicing spot beam is invalidated in the user terminal memory.

Referring back to Block 315, if the current servicing spot beam and the previous servicing spot beam define a spot beam pair and the user terminal timer value is included in the current spot beam registration information, the satellite communications system determines if the user terminal timer value exceeds the period of oscillation associated with the current and previous servicing spot beams (Block 320). As discussed above, the user terminal timer value provides the duration of service provided by the current servicing spot beam within a spot beam pair. If the user terminal timer value exceeds the period of oscillation associated with the current and previous servicing spot beams, the satellite communications system determines that the user terminal should be registered with the single current servicing spot beam (Block 330), determines that the previous servicing spot beam stored in the user terminal is invalid, and transmits the updated spot beam registration information to the user terminal (Block 326). The user terminal updates the current spot beam registration information stored in the user terminal using the received updated spot beam registration information. The user terminal operations then resume at Block 340. Accordingly, subsequent pages from the satellite communications system for the user terminal will be transmitted via the spot beam with which the user terminal is registered.

Referring back to Block 320, If the user terminal timer value does not exceed the period of oscillation associated with the current and previous servicing spot beams, the satellite communications system indicates that the user terminal is registered with the spot beam pair and transmits the updated spot beam registration information to the user terminal (Block 325).

Referring now back to Block 307, if the user terminal does initiate non-location update procedure communications with the satellite communications system, the current spot beam registration information is transmitted to the satellite communications system (Block 306). The current spot beam registration information is the user terminal timer value if the user terminal timer value is running (such as when the user terminal is registered in a spot beam pair). The satellite communications system examines the user terminal timer value, if included in the current spot beam registration information, in relation to the inclined satellite orbit oscillation period (Block 308). When the user terminal timer value exceeds the inclined orbit oscillation time, processing continues at Block 330 as described above. The user terminal updates the current spot beam registration by invalidating the previous LAI stored in the user terminal (Block 333). Referring back to Block 308, when the user terminal timer does not exceed the inclined orbit oscillation time, normal operations continue at Block 365.

The present invention offers several advantages over the prior art. In particular, determining updated spot beam registration at the satellite communications system may help reduce the cost and complexity of correcting design errors and implementing operational adjustments. Instead, operational adjustments and corrections may be implemented at the satellite communications system rather than at each user terminal. In addition, the present invention allows a reduction in the number of location update procedures associated with user terminal mobility. In particular, the user terminal uses one location update procedure to register with a single spot beam after having been registered with a spot beam pair which can be triggered by the detection of a new servicing spot beam other than the current or previous servicing spot beams or the expiration of the periodic location update timer. This situation may be common when a user terminal is moved from a single spot beam to an adjacent spot beam which defines a spot beam pair with the previous servicing spot beam. In contrast, according to the prior art, the user terminal may initiate an additional location update procedure to register with a single spot beam after having been registered with a spot beam pair. Consequently, moving the user terminal to an adjacent spot beam may cause an additional location update procedure to be used.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of registering a user terminal with a satellite communications system including a plurality of satellite spot beam transceivers wherein each of the satellite spot beam transceivers defines a respective spot beam, said method comprising the steps of:

transmitting current spot beam registration information from the user terminal to the satellite communications system, wherein the current spot beam registration information identifies at least one spot beam via which the satellite communication system currently pages the user terminal;

determining updated spot beam registration information for the user terminal at the satellite communications system based on the current spot beam registration information received from the user terminal and based on a periodic oscillation associated with alternating spot beam coverage of the user terminal;

transmitting said updated spot beam registration information from the satellite communications system to the user terminal, wherein the updated spot beam registration information is different than the current spot beam registration information and identifies at least one spot beam via which the satellite communication system currently pages the user terminal; and     updating the current spot beam registration information for the user terminal using the updated spot beam registration information received from the satellite communications system.

2. The method of claim 1 wherein the current spot beam registration information comprises a current servicing spot beam and a previous servicing spot beam wherein the current servicing spot beam currently provides service to the user terminal and wherein the previous spot beam provided service to the user terminal immediately prior to the current servicing spot beam.

3. A method of registering a user terminal with a satellite communications system including a plurality of satellite spot beam transceivers wherein each of the satellite spot beam transceivers defines a respective spot beam, said method comprising the steps of:

transmitting current spot beam registration information from the user terminal to the satellite communications system, wherein the current spot beam registration information comprises a current servicing spot beam and a previous servicing spot beam wherein the current servicing spot beam currently provides service to the user terminal and wherein the previous spot beam provided service to the user terminal immediately prior to the current servicing spot beam and wherein the current spot beam registration information further comprises a user terminal timer value wherein the user terminal timer value provides a duration of service provided by the current servicing spot beam within a spot beam pair wherein the current servicing spot beam and the previous servicing spot beam define the spot beam pair;

determining updated spot beam registration information for the user terminal at the satellite communications system based on the current spot beam registration information received from the user terminal;

transmitting said updated spot beam registration information from the satellite communications system to the user terminal; and updating the current spot beam registration information for the user terminal using the updated spot beam registration information received from the satellite communications system.

4. The method of claim 3 wherein the updated spot beam registration information comprises information indicating that the user terminal is registered with a single spot beam when the current spot beam and the previous spot beam define a spot beam pair and the user terminal time value exceeds or is equal to a period of oscillation associated with the current and previous servicing spot beams.

5. The method of claim 3 wherein the updated spot beam registration information comprises information indicating that the user terminal is registered with a spot beam pair when the current servicing spot beam and the previous servicing spot beam define a spot beam pair and the user terminal time value does not exceed the period of oscillation associated with the current and previous servicing spot beams.

6. The method of claim 3 wherein said step of updating further comprises the steps of invalidating the previous spot beam in the user terminal and clearing a user terminal timer when the updated spot beam registration information received from the communication satellite system indicates that the user terminal is registered with a single spot beam.

7. A method of registering a user terminal with a satellite communications system including a plurality of satellite spot beam transceivers wherein each of the satellite spot beam transceivers defines a respective spot beam said method comprising the steps of:

transmitting current spot beam registration information from the user terminal to the satellite communications system, wherein the current spot beam registration information comprises a current servicing spot beam and a previous servicing spot beam wherein the current servicing spot beam currently provides service to the user terminal and wherein the previous spot beam provided service to the user terminal immediately prior to the current servicing spot beam, determining updated spot beam registration information for the user terminal at the satellite communications system based on the current spot beam registration information received from the user terminal;

transmitting said updated spot beam registration information from the satellite communications system to the user terminal; and updating the current spot beam registration information for the user terminal using the updated spot beam registration information received from the satellite communications system, wherein the updated spot beam registration information comprises information indicating that the user, terminal is registered with a single spot beam when the current servicing spot beam and the previous servicing spot beam do not define a spot beam pair wherein the spot beam pair is defined by two adjacent spot beams.

8. The method of claim 7 wherein spot beam pair identifiers are stored in a database wherein the spot beam pair identifiers provide an indication of whether the current servicing spot beam and the previous servicing spot beam define the spot beam pair.

9. The method of claim 8 wherein the database further comprises a home location register and a visiting location register wherein the home location register stores identifiers of subscribers and wherein the visiting location register stores identifiers of affiliated subscribers.

10. The method of claim 2 wherein said step of updating comprises the step of storing the updated spot beam registration information received from the satellite communications system in the user terminal.

11. The method of claim 2 wherein said step of transmitting the current spot beam registration information is triggered upon detection of new servicing spot beam other than the current servicing spot beam and the previous servicing spot beam.

12. A method of registering a user terminal with a satellite communications system including a plurality of satellite spot beam transceivers wherein each of the satellite spot beam transceivers defines a respective spot beam, said method comprising the steps of:

transmitting current spot beam registration information from the user terminal to the satellite communications system;

determining updated spot beam registration information for the user terminal at the satellite communications system based on the current spot beam registration information received from the user terminal;

transmitting said updated spot beam registration information from the satellite communications system to the user terminal;

updating the current spot beam registration information for the user terminal using the updated spot beam registration information received from the satellite communications system;

detecting a new servicing spot beam;

designating the current servicing spot beam as the previous servicing spot beam;

designating the new servicing spot beam as the current servicing spot beam; and clearing a user terminal time value wherein the user terminal time value measures the duration of the service provided by the current servicing spot beam within a spot beam pair wherein the current spot beam and the previous spot beam form the spot beam pair.

13. The method of claim 1 wherein said step of transmitting current spot beam registration information is triggered by communication between the user terminal and the satellite communications system.

14. A method of registering a user terminal with a satellite communications system including a plurality of satellite spot beam transceivers wherein each of the satellite spot beam transceivers defines a respective spot beam, said method comprising the steps of:

transmitting current spot beam registration information from the user terminal to the satellite communications system, wherein said step of transmitting the current spot beam registration information is triggered upon expiration of a periodic location update timer wherein the periodic location update timer measures a duration of service provided to the user terminal since a previous expiration of the periodic location update timer;

determining updated spot beam registration information for the user terminal at the satellite communications system based on the current spot beam registration information received from the user terminal;

transmitting said updated spot beam registration information from the satellite communications system to the user terminal; and     updating the current spot beam registration information for the user terminal using the updated spot beam registration information received from the satellite communications system.

15. A method of registering a user terminal with a satellite communications system including a plurality of satellite spot beam transceivers wherein each of the satellite spot beam transceivers defines a respective spot beam, said method comprising the steps of:

transmitting current spot beam registration information from the user terminal to the satellite communications system, wherein the current spot beam registration information comprises a user terminal timer value wherein the user terminal timer value provides a duration of service provided by a current servicing spot beam within a spot beam pair wherein the current servicing spot beam and a previous servicing spot beam define the spot beam pair;

determining updated spot beam registration information for the user terminal at the satellite communications system based on the current spot beam registration information received from the user terminal;

transmitting said updated spot beam registration information from the satellite communications system to the user terminal, and     updating the current spot beam registration information for the user terminal using the updated spot beam registration information received from the satellite communications system.

16. The method of claim 15 wherein the updated spot beam registration information indicates that the user terminal is registered with a single spot beam when the user terminal time value exceeds or is equal to a period of oscillation associated with the current and previous servicing spot beams.

17. The method of claim 15 wherein the updated spot beam registration information indicates that the user terminal is registered with a spot beam pair when the user terminal time value does not exceed the period of oscillation associated with the current and previous servicing spot beams.

18. A user terminal for communicating with a satellite communications system including a plurality of satellite spot beam transceivers wherein each of the satellite spot beam transceivers defines a respective spot beam, said user terminal comprising:

a transceiver which transmits and receives communications to and from the satellite communications system;

memory wherein said memory stores current spot beam registration information for the user terminal; and     a processor coupled to said transceiver and said memory wherein said processor transmits said current spot beam registration information from said memory through said transceiver to the satellite communications system, wherein the current spot beam registration information identifies at least one spot beam via which the satellite communication system currently pages the user terminal, wherein the satellite communications system determines updated spot beam registration information based on said current spot beam registration information received from the user terminal and based on a periodic oscillation associated with alternating spot beam coverage of the user terminal, wherein said processor receives said updated spot beam registration information from the satellite communications system through said transceiver, wherein the updated spot beam registration information is different than the current spot beam registration information and identifies at least one spot beam via which the satellite communication system currently pages the user terminal, and wherein said processor stores said updated spot beam registration information from the satellite communications system in said memory.

19. The user terminal of claim 18 wherein the current spot beam registration information comprises a current servicing spot beam and a previous servicing spot beam wherein the current servicing spot beam currently provides service to the user terminal and wherein the previous spot beam provided service to the user terminal immediately prior to the current servicing spot beam.

20. A user terminal for communicating with a satellite communications system including a plurality of satellite spot beam transceivers wherein each of the satellite spot beam transceivers defines a respective spot beam, said user terminal comprising:

a transceiver which transmits and receives communications to and from the satellite communications system;

memory wherein said memory stores current spot beam registration information for the user terminal; and     a processor coupled to said transceiver and said memory wherein said processor transmits said current spot beam registration information from said memory through said transceiver to the satellite communications system, wherein the satellite communications system determines updated spot beam registration information based on said current spot beam registration information received from the user terminal, wherein said processor receives said updated spot beam registration information from the satellite communications system through said transceiver, and wherein said processor stores said updated spot beam registration information from the satellite communications system in said memory, wherein the current spot beam registration information comprises a current servicing spot beam and a previous servicing spot beam wherein the current servicing spot beam currently provides service to the user terminal and wherein the previous spot beam provided service to the user terminal immediately prior to the current servicing spot beam, wherein the current spot beam registration information further comprises a user terminal timer value wherein the user terminal timer value provides a duration of service provided by the current servicing spot beam within a spot beam pair wherein the current servicing spot beam and the previous servicing spotbeam define the spot beam pair.

21. The user terminal of claim 20 wherein the updated spot beam registration information comprises information indicating that the user terminal is registered with a single spot beam when the current spot beam and the previous spot beam define a spot beam pair and the user terminal time value exceeds or is equal to a period of oscillation associated with the current and previous servicing spot beams.

22. The user terminal of claim 20 wherein the updated spot beam registration information comprises information indicating that the user terminal is registered with a spot beam pair when the current servicing spot beam and the previous servicing spot beam define a spot beam pair and the user terminal time value does not exceed the period of oscillation associated with the current and previous servicing spot beams.

23. The user terminal of claim 20 wherein updating further comprises invalidating the previous spot beam in the user terminal and clearing a user terminal timer when the updated spot beam registration information received from the communication satellite system indicates that the user terminal is registered with a single spot beam.

24. A user terminal for communicating with a satellite communications system including a plurality of satellite spot beam transceivers wherein each of the satellite spot beam transceivers defines a respective spot beam, said user terminal comprising:
    a transceiver which transmits and receives communications to and from the satellite communications system;
    memory wherein said memory stores current spot beam registration information for the user terminal; and
    a processor coupled to said transceiver and said memory wherein said processor transmits said current spot beam registration information from said memory through said transceiver to the satellite communications system, wherein the satellite communications system determines updated spot beam registration information based on said current spot beam registration information received from the user terminal wherein said processor receives said updated spot beam registration information from the satellite communications system through said transceiver, and wherein said processor stores said updated spot beam registration information from the satellite communications system in said memory, wherein the current spot beam registration information comprises a current servicing spot beam and a previous servicing spot beam wherein the current servicing spot beam currently provides service to the user terminal and wherein the previous spot beam provided service to the user terminal immediately prior to the current servicing spot beam, wherein the updated spot beam registration information comprises information indicating that the user terminal is registered with a single spot beam when the current servicing spot beam and the previous servicing spot beam do not define a spot beam pair wherein the spot beam pair is formed by two adjacent spot beams.

25. The user terminal of claim 19 wherein the transmission of current spot beam registration information is triggered upon detection of new servicing spot beam other than the current servicing spot beam and the previous servicing spot beam.

26. The user terminal of claim 19 wherein updating comprises storing the updated spot beam registration information received from the satellite communications system in the user terminal.

27. The user terminal of claim 18 wherein the transmission of current spot beam registration information is triggered by communication between the user terminal and the satellite communications system.

28. A user terminal for communicating with a satellite communications system including a plurality of satellite spot beam transceivers wherein each of the satellite spot beam transceivers defines a respective spot beam, said user terminal comprising:
    a transceiver which transmits and receives communications to and from the satellite communications system;
    memory wherein said memory stores current spot beam registration information for the user terminal; and
    a processor coupled to said transceiver and said memory wherein said processor transmits said current spot beam registration information from said memory through said transceiver to the satellite communications system, wherein the satellite communications system determines updated spot beam registration information based on said current spot beam registration information received from the user terminal, wherein said processor receives said updated spot beam registration information from the satellite communications system through said transceiver, and wherein said processor stores said updated spot beam registration information from the satellite communications system in said memory wherein the transmission of current spot beam registration information is triggered upon expiration of a periodic location update timer wherein the periodic location update timer measures a duration of service provided to the user terminal since a previous expiration of the periodic location update timer.

29. A user terminal for communicating with a satellite communications system including a plurality of satellite spot beam transceivers wherein each of the satellite spot beam transceivers defines a respective spot beam, said user terminal comprising:
    a transceiver which transmits and receives communications to and from the satellite communications system;
    memory wherein said memory stores current spot beam registration information for the user terminal; and
    a processor coupled to said transceiver and said memory wherein said processor transmits said current spot beam registration information from said memory through said transceiver to the satellite communications system, wherein the satellite communications system determines updated spot beam registration information based on said current spot beam registration information received from the user terminal, wherein said processor receives said updated spot beam registration information from the satellite communications system through said transceiver, and wherein said processor stores said updated spot beam registration information from the satellite communications system in said memory, wherein said processor detects a new servicing spot beam, designates the current servicing spot beam as the previous servicing spot beam, designates the new servicing spot beam as the current servicing spot beam and clears a user terminal time value wherein the user terminal time value measures the duration of the service provided by the current servicing spot beam within a spot beam pair wherein the current spot beam and the previous spot beam form the spot beam pair.

30. A user terminal for communicating with a satellite communications system including a plurality of satellite spot beam transceivers wherein each of the satellite spot beam transceivers defines a respective spot beam, said user terminal comprising:

a transceiver which transmits and receives communications to and from the satellite communications system;

memory wherein said memory stores current spot beam registration information for the user terminal; and a processor coupled to said transceiver and said memory wherein said processor transmits said current spot beam registration information from said memory through said transceiver to the satellite communications system, wherein the satellite communications system determines updated spot beam registration information based on said current spotbeam registration information received from the user terminal, wherein said processor receives said updated spot beam registration information from the satellite communications system through said transceiver, and wherein said processor stores said updated spot beam registration information from the satellite communications system in said memory, wherein the current spot beam registration information comprises a user terminal timer value wherein the user terminal timer value provides a duration of service provided by a current servicing spot beam within a spot beam pair wherein the current servicing spot beam and a previous servicing spot beam define the spot beam pair.

31. A satellite communications system for communicating with a user terminal, the system comprising:

a plurality of satellite spot beam transceivers wherein each of the satellite spot beam transceivers defines a respective spot beam; and a controller coupled to said spot beam transceivers wherein said controller receives current spot beam registration information from the user terminal through one of said transceivers, wherein the current spot beam registration information identifies at least one spot beam via which the satellite communication system currently pages the user terminal, wherein said controller determines updated spot beam registration information based on said current spot beam registration information and based on a periodic oscillation associated with alternating spot beam coverage of the user terminal, and wherein said controller transmits said updated spot beam registration information to the user terminal through said transceiver so that the current spot beam registration information is updated at the user terminal using said updated spot beam registration information, wherein the updated spot beam registration information is different than the current spot beam registration information and identifies at least one spot beam via which the satellite communication system currently pages the user terminal.

32. The satellite communications system of claim 31 wherein the current spot beam registration information comprises a current servicing spot beam and a previous servicing spot beam wherein the current servicing spot beam currently provides service to the user terminal and wherein the previous spot beam provided service to the user terminal immediately prior to the current servicing spot beam.

33. A satellite communications system for communicating with a user terminal, the system comprising:

a plurality of satellite spot beam transceivers wherein each of the satellite spot beam transceivers defines a respective spot beam; and a controller coupled to said spot beam transceivers wherein said controller receives current spot beam registration information from the user terminal through one of said transceivers, wherein said controller determines updated spot beam registration information based on said current spot beam registration information, and wherein said controller transmits said updated spot beam registration information to the user terminal through said transceiver so that the current spot beam registration information is updated at the user terminal using said updated spot beam registration information, wherein the current spot beam registration information comprises a current servicing spot beam and a previous servicing spot beam wherein the current servicing spot beam currently provides service to the user terminal and wherein the previous spot beam provided service to the user terminal immediately prior to the current servicing spot beam, wherein the current spot beam registration information further comprises a user terminal timer value wherein the user terminal timer value provides a duration of service provided by the current servicing spot beam within a spot beam pair wherein the current servicing spot beam and the previous servicing spot beam define the spot beam pair.

34. The satellite communications system of claim 33 wherein the updated spot beam registration information comprises information indicating that the user terminal is registered with a spot beam pair when the current servicing spot beam and the previous servicing spot beam define a spot beam pair and the user terminal time value does not exceed the period of oscillation associated with the current and previous servicing spot beams.

35. The satellite communications system of claim 33 wherein the updated spot beam registration information comprises information indicating that the user terminal is registered with a single spot beam when the current spot beam and the previous spot beam define a spot beam pair and the user terminal time value exceeds or is equal to a period of oscillation associated with the current and previous servicing spot beams.

36. A satellite communications system for communicating with a user terminal, the system comprising:

a plurality of satellite spot beam transceivers wherein each of the satellite spot beam transceivers defines a respective spot beam; and a controller coupled to said spot beam transceivers wherein said controller receives current spot beam registration information from the user terminal through one of said transceivers, wherein said controller determines updated spot beam registration information based on said current spot beam registration information, and wherein said controller transmits said updated spot beam registration information to the user terminal through said transceiver so that the current spot beam registration information is updated at the user terminal using said updated spot beam registration information, wherein the current spot beam registration information comprises a current servicing spot beam and a previous servicing spot beam wherein the current servicing spot beam currently provides service to the user terminal and wherein the previous spot beam provided service to the user terminal immediately prior to the current servicing spot beam, wherein the updated spot beam registration information comprises information indicating that the user terminal is registered with a single spot beam when the current servicing spot beam and the previous servicing spot beam do not define a spot beam pair wherein the spot beam pair is formed by two adjacent spot beams.

37. The satellite communications system of claim 34 wherein spot beam pair identifiers are stored in a database wherein the spot beam pair identifiers provide an indication of whether the current servicing spot beam and the previous servicing spot beam define the spot beam pair.

38. The satellite communications system of claim 37 wherein the database further comprises a home location register and a visiting location register wherein the home location register stores identifiers of subscribers and wherein the visiting location register stores identifiers of affiliated subscribers.

39. A satellite communications system for communicating with a user terminal, the system comprising:
   a plurality of satellite spot beam transceivers wherein each of the satellite spot beam transceivers defines a respective spot beam; and
   a controller coupled to said spot beam transceivers wherein said controller receives current spot beam registration information from the user terminal through one of said transceivers, wherein said controller determines updated spot beam registration information based on said current spot beam registration information, and wherein said controller transmits said updated spot beam registration information to the user terminal through said transceiver so that the current spot beam registration information is updated at the user terminal using said updated spot beam registration information, wherein the updated spot beam registration information indicates that the user terminal is registered with a single spot beam when the user terminal time value exceeds or is equal to a period of oscillation associated with the current and previous servicing spot beams.

40. The satellite communications system of claim 39 wherein the updated spot beam registration information indicates that the user terminal is registered with a spot beam pair when the user terminal time value does not exceed the period of oscillation associated with the current and previous servicing spot beams.

41. A method of registering a user terminal with a satellite communications system including a plurality of satellite spot beam transceivers wherein each of the satellite spot beam transceivers defines a respective spot beam, said method comprising the steps of:
   receiving current spot beam registration information from the user terminal at the satellite communications system, wherein the current spot beam registration information identifies at least one spot beam via which the satellite communication system currently pages the user terminal;
   determining updated spot beam registration information for the user terminal at the satellite communications system based on the current spot beam registration information received from the user terminal and based on a periodic oscillation associated with alternating spot beam coverage of the user terminal; and
   transmitting said updated spot beam registration information from the satellite communications system to the user terminal, wherein the updated spot beam registration information is different than the current spot beam registration information and identifies at least one spot beam via which the satellite communication system currently pages the user terminal.

42. The method of claim 41 wherein the current spot beam registration information comprises a current servicing spot beam and a previous servicing spot beam wherein the current servicing spot beam currently provides service to the user terminal and wherein the previous spot beam provided service to the user terminal immediately prior to the current servicing spot beam.

43. A method of registering a user terminal with a satellite communications system including a plurality of satellite spot beam transceivers wherein each of the satellite spot beam transceivers defines a respective spot beam, said method comprising the steps of:
   receiving current spot beam registration information from the user terminal at the satellite communications system, wherein the current spot beam registration information comprises a current servicing spot beam and a previous servicing spot beam wherein the current servicing spot beam currently provides service to the user terminal and wherein the previous spot beam provided service to the user terminal immediately prior to the current servicing spot beam, wherein the current spot beam registration information further comprises a user terminal timer value wherein the user terminal timer value provides a duration of service provided by the current servicing spot beam within a spot beam pair wherein the current servicing spot beam and the previous servicing spot beam define the spot beam pair;
   determining updated spot beam registration information for the user terminal at the satellite communications system based on the current spot beam registration information received from the user terminal; and
   transmitting said updated spot beam registration information from the satellite communications system to the user terminal.

44. A method of registering a user terminal with a satellite communications system including a plurality of satellite spot beam transceivers wherein each of the satellite spot beam transceivers defines a respective spot beam, said method comprising the steps of:
   transmitting current spot beam registration information from the user terminal to the satellite communications system, wherein the current spot beam registration information identifies at least one spot beam via which the satellite communication system currently pages the user terminal;
   receiving updated spot beam registration information from the satellite communications system at the user terminal, wherein the updated spot beam registration information is different than the current spot beam registration information and identifies at least one spot beam via which the satellite communication system currently pages the user terminal; and
   updating the current spot beam registration information for the user terminal using the updated spot beam registration information received from the satellite communications system based on a periodic oscillation associated with alternating spot beam coverage of the user terminal.

45. The method of claim 44 wherein the current spot beam registration information comprises a current servicing spot beam and a previous servicing spot beam wherein the current servicing spot beam currently provides service to the user terminal and wherein the previous spot beam provided service to the user terminal immediately prior to the current servicing spot beam.

46. A method of registering a user terminal with a satellite communications system including a plurality of satellite spot beam transceivers wherein each of the satellite spot beam transceivers defines a respective spot beam, said method comprising the steps of:

transmitting current spot beam registration information from the user terminal to the satellite communications system, wherein the current spot beam registration information comprises a current servicing spot beam and a previous servicing spot beam wherein the current servicing spot beam currently provides service to the user terminal and wherein the previous spot beam provided service to the user terminal immediately prior to the current servicing spot beam, wherein the current spot beam registration information further comprises a user terminal timer value wherein the user terminal timer value provides a duration of service provided by the current servicing spot beam within a spot beam pair wherein the current servicing spot beam and the previous servicing spot beam define the spot beam pair;

receiving updated spot beam registration information from the satellite communications system at the user terminal; and updating the current spot beam registration information for the user terminal using the updated spot beam registration information received from the satellite communications system.

* * * * *